United States Patent
Minhazuddin

(10) Patent No.: US 7,643,414 B1
(45) Date of Patent: Jan. 5, 2010

(54) WAN KEEPER EFFICIENT BANDWIDTH MANAGEMENT

(75) Inventor: Muneyb Minhazuddin, Quakers Hill (AU)

(73) Assignee: Avaya Inc., Basking Ridge, NJ (US)

( * ) Notice: Subject to any disclaimer, the term of this patent is extended or adjusted under 35 U.S.C. 154(b) by 1012 days.

(21) Appl. No.: 10/776,894

(22) Filed: Feb. 10, 2004

(51) Int. Cl.
*H04L 1/00* (2006.01)
(52) U.S. Cl. ................................ 370/230; 370/468
(58) Field of Classification Search ............... 370/229, 370/356, 468, 395, 409, 230, 252, 352
See application file for complete search history.

(56) References Cited

U.S. PATENT DOCUMENTS

| | | | |
|---|---|---|---|
| 4,947,390 | A | 8/1990 | Sheehy |
| 5,450,394 | A | 9/1995 | Gruber et al. |
| 6,097,722 | A * | 8/2000 | Graham et al. ......... 370/395.21 |
| 6,240,066 | B1 * | 5/2001 | Nagarajan et al. ........... 370/230 |
| 6,363,065 | B1 | 3/2002 | Thornton et al. |
| 6,393,480 | B1 * | 5/2002 | Qin et al. ..................... 709/224 |
| 6,442,615 | B1 | 8/2002 | Nordenstam et al. |
| 6,452,922 | B1 * | 9/2002 | Ho .............................. 370/352 |
| 6,581,031 | B1 * | 6/2003 | Ito et al. ..................... 704/222 |
| 6,665,293 | B2 | 12/2003 | Thornton et al. |
| 6,728,261 | B1 | 4/2004 | Sasson et al. |
| 6,728,670 | B2 | 4/2004 | Schenkel et al. |
| 6,795,431 | B2 | 9/2004 | Endo |
| 6,922,417 | B2 | 7/2005 | Vanlint |
| 6,937,622 | B2 | 8/2005 | Gross |
| 7,023,839 | B1 * | 4/2006 | Shaffer et al. ............... 370/356 |
| 7,127,496 | B2 | 10/2006 | Isozu et al. |
| 7,274,684 | B2 | 9/2007 | Young et al. |
| 7,277,936 | B2 | 10/2007 | Frietsch |
| 7,483,379 | B2 | 1/2009 | Kan et al. |
| 2002/0006131 | A1 * | 1/2002 | Johnsson ................... 370/395.6 |
| 2002/0006136 | A1 * | 1/2002 | Mallory et al. .............. 370/466 |

(Continued)

FOREIGN PATENT DOCUMENTS

CA 2488401 5/1997

(Continued)

OTHER PUBLICATIONS

Robert M. Wienski, "IP Telehony Access, Transport, and Gateway Fundamentals," Illuminet White Paper (undated), pp. 1-9.

(Continued)

*Primary Examiner*—Kwang B Yao
*Assistant Examiner*—Andrew Lai
(74) *Attorney, Agent, or Firm*—Sheridan Ross P.C.

(57) ABSTRACT

The present invention is directed to a call admission controller that is operable to: (a) determine at least one of (i) a bandwidth utilization level for a first path including a first link; (ii) an available bandwidth level for the first path; and (iii) one or more Quality of Service or QoS metrics for the first path; (b) compare the at least one of (i) a bandwidth utilization level; (ii) an available bandwidth level; and (iii) one or more Quality of Service or QoS metrics to one or more selected thresholds to determine whether a new live voice communication may be set up with a first selected codec; and (iii) when a new live voice communication may not be set up with the first selected codec, perform at least one of the following operations: (i) select a second different codec from among a plurality of possible codecs for the new live voice communication, wherein the second codec has a lower bit rate than the first codec; (ii) change an existing live voice communication from the first codec to the second codec; and (iii) redirect the new live voice communication from the first path to a second different path, wherein the second path does not include the first link.

39 Claims, 3 Drawing Sheets

U.S. PATENT DOCUMENTS

| | | | |
|---|---|---|---|
| 2002/0166063 A1* | 11/2002 | Lachman et al. | 713/200 |
| 2003/0023710 A1 | 1/2003 | Corlett et al. | |
| 2003/0063569 A1* | 4/2003 | Kalliokulju et al. | 370/252 |
| 2003/0069057 A1 | 4/2003 | DeFrees-Parrott | |
| 2003/0074443 A1* | 4/2003 | Melaku et al. | 709/224 |
| 2003/0074674 A1* | 4/2003 | Magliaro | 725/118 |
| 2003/0088698 A1* | 5/2003 | Singh et al. | 709/239 |
| 2003/0093244 A1 | 5/2003 | Corlett et al. | |
| 2003/0097438 A1 | 5/2003 | Bearden et al. | |
| 2003/0123388 A1* | 7/2003 | Bradd | 370/230 |
| 2004/0008627 A1* | 1/2004 | Garg et al. | 370/235 |
| 2004/0066780 A1 | 4/2004 | Shankar et al. | |
| 2004/0167977 A1 | 8/2004 | Douglas et al. | |
| 2006/0262774 A1 | 11/2006 | Moldestad et al. | |

FOREIGN PATENT DOCUMENTS

| | | |
|---|---|---|
| EP | 1372326 | 12/2003 |

OTHER PUBLICATIONS

"How to configure an Avayan™ IP600 Server with Cisco Gatekeeper—Issue 1.0," Avaya Solution & Interoperability Test Lab Application Notes (Jun. 20, 2002), pp. 1-20.

"Avaya IP Telephony Implementation Guide," Avaya Application Note (May 2003), pp. 1-71.

"Avaya IP Softphone," Avaya (2003), 4 pages.

"Alternate Gatekeeper and C-LAN Load Balancing Configuration for Avaya™, IP Telephones, Avaya™ Softphones and an Avaya™ S8700 Media Server/Avaya™ G600 Gateway—Issue 1.0," Avaya Solution & Interoperability Test Lab Application Notes (Jun. 8, 2002), pp. 1-7.

Zoltan Laday, "SP Scale Packet Voice Networks," Cisco Systems (2001), pp. 1-37.

Ismail Dalgic et al., "Quality of Service Based Routing for IP Telephony," 3Com Corporation (undated), available at http://pont.net/aboutme/QoSRouting.pdf, 8 pages.

Cisco CallManager Systems Guide, "Chapter 7: Call Admission Control" Doc. No. 78-13341-01 (undated), pp. 7-1-7-14.

Cisco CallManager, Cisco Systems (printed Sep. 16, 2003), 9 pages.

U.S. Appl. No. 10/459,948, filed Jun. 12, 2003, Adhikari et al.

U.S. Appl. No. 10/460,700, filed Jun. 12, 2003, Adhikari et al.

"Omegon Unveils NetAlly Solution; Industry-First Fully Active Service Quality Assurance Platform Assures Customers Unprecedented Levels of Network Availability and Reliability," available at http://www.itsecurity.com/tecsnews/sep2000/sep517.htm (Sep. 2000), pp. 1-3.

"Chariot VoIP Assessor Version 1.0," http://www.tmcnet.com/it/0302/0302labs5.htm (Mar. 2002), pp. 1-4.

"VoIP Management and Network Testing," http://www.netig.com/solutions/voip/default.asp, pp. 1-3, 2002.

"Chariot," http://www.netiq.com/products/chr/, pp. 1-2, 2002.

"VoIP Test Module for Chariot," http://www.netig.com/products/chr/voipmodule.asp, pp. 1-2, 2002.

Telchemy, Inc., "Monitoring Voice Quality In Voice Over IP Networks," 3 pages, 2001.

Telchemy, Inc., "Bringing Intelligence to Networks," http://www.telchemy.com/, pp. 1-5, 2001.

Viola Networks, "NetAlly® VoIP—VoIP Readiness Testing and Deployment," available at http//www.omega.com/netally_voip.asp (2002), pp. 1-4.

Moshe Sidi et al., "Converged Network Performance Verification and e-Support Using NetAlly®," Omegon Networks Ltd., (Jun, 2001), pp. 1-13.

Moshe Sidi et al., "Converged Network Performance Verification and e-Support Using NetAlly®," Omegon Networks Ltd., (Jun. 2001), pp. 1-13.

Moshe Sidi, "Reality-based VoIP Readiness Testing Using NetAlly® VoIP," Viola Networks (Apr. 2002), pp. 1-10.

Moshe Sidi, "Readying Your Network for VoIP: Get it Right the First Time," Viola Networks (Apr. 2002), pp. 1-9.

J.Q. Walker, "A Handbook for Successful VoIP Deployment Network Testing, QoS, and More," NetIQ Corporation, (2002), pp. 1-13.

"NetIQ Vivinet Diagnostics," available at http://www.netig.com/products/vd/default.asp (1993-2003), pp. 1-2.

"NetIQ—Checklist of VoIP Network Design Tips," NetIQ Corporation (2002), 3 pages.

Brix Networks, "Library," available at http://www.brixnet.com/library/library_register.cfm (2003), 1 page.

Brix Networks, "The Brix System," available at http://www.brixnet.com/products/products_overview.html (2003), 1 page.

Y. Breitbert et al., "Topology Discovery in Heterogeneous IP Networks," Proceedings of IEEE Infocom 2000 (Mar. 2000), 10 pages.

B. Huffaker et al., "Topology Discovery by Active Probing," CAIDA (2002), 8 pages.

M.R. Meiss et al., "Standards-Based Discovery of Switched Ethernet Topology," Advanced Network Management Lab, (Apr. 2002), pp. 1-20.

R. Siamwalla et al., "Discovering Internet Topology," Cornell University (Jul. 1998), pp. 1-16.

Postel, "User Datagram Protocol", Internet Engineering Task Force (IETF) Request for Comments (RFC) 768, Aug. 28, 1980, available at http://www.ietf.org/rfc/rfc768.txt, pp. 1-3.

Schulzrine, et al., "RTP: A Transport Protocol for Real-Time Applications", IETF RFC 1889; Real-Time Transport Protocol (RTP), Jan. 1996, available at http://www.ietf.org/rfc/rfc1889.txt, pp. 1-6.

Perkins, et al. "RTP Testing Strategies",IETF RFC 3158, RTP Control Protocol (RTCP), Aug. 2001, available at http://www.ietf.org/rfc/rfc3158.txt, pp. 1-21.

Rosenberg, et al., "SIP: Session Initiation Protocol", IETF RFC 3261, Jun. 2002, available at http://vvww.ietf.org/rfc/rfc3261.txt, pp. 1-252.

Author Unknown, "Packet-based multimedia communication systems", International Telecommunication Union-Telecommunications Standardization Sector (ITU-T) Recommendation H.323, Nov. 2000, pp. 1-258.

Author Unknown, "Call Signaling protocols and media stream packetization for packet-based multimedia communication systems", ITU-T Recommendation H.225, Nov. 2000, pp. 1-251.

Background of the Invention- For the above captioned application (previously cited).

* cited by examiner

| Codec | Available Bandwidth |
|---|---|
| G.711 | 64 Kbps |
| G.722 | 56 Kbps |
| G.726 | 40 Kbps |
| G.727 | 32 Kbps |
| G.723 | 24 Kbps |
| G.728 | 16 Kbps |
| G.723.1 | 6.4 Kbps |

WAN KEEPER EFFICIENT BANDWIDTH MANAGEMENT

FIELD OF THE INVENTION

The present invention is related generally to bandwidth management and specifically to bandwidth management in packet-switched networks.

BACKGROUND OF THE INVENTION

Each year the percentage of voice communications transmitted over packet-switched networks, such as the Internet, is increasing while the percentage of voice communications transmitted over traditional circuit-switched networks, such as the Public Switch Telecommunications Network or PSTN, is decreasing. Substantial cost savings, particularly for long distance calls, can be realized using Voice Over IP or VoIP when compared to PSTN calls. A problem with this transition to packet-switched networks is maintaining a high Quality of Service or QoS notwithstanding higher levels of traffic across the network. To provide the continuous data stream required for real-time phone calls and video-conferencing, certain QoS metrics, particularly packet latency, must be kept low with a low variance throughout the many switching and routing hops the packets may encounter. As will be appreciated, "packet latency" or "packet delay" refers to the length of time required for a packet of data to travel from one designated point to another. While voice and video quality is certainly in the user's interest, it also provides surprising benefits for service providers. Studies done of cellular networks show that, as voice quality increases, the time users spend on the network also increases, which means billable hours—and thus revenues—increase too.

One approach used to provide enhanced QoS metrics is to encode the voice stream. Various compression/decompression algorithms (or codecs) have been developed. The codecs are able to take an audio stream occupying a first bandwidth and compress it to occupy a much smaller second bandwidth. As will be appreciated, "bandwidth" refers to a measure of the data transmission capacity of a network or a component thereof and is usually expressed in how many bits of data can be moved from one point to another in a unit of time under ideal conditions. Examples of codecs are as follows:

| ITU Codec Standard | Bit Rate |
|---|---|
| G.711 (Pulse Code Modulation) | 3.4 kHz at 56 or 64 Kbps |
| G.722 (audio codec) | 7 kHz at anywhere between 48, 56 or 64 Kbps |
| G.722.1 (wideband) | 7 kHz at 24 or 32 Kbps |
| G.723 | 3.4 kHz at 24 Kbps |
| G.723.1 | 3.4 kHz at 5.3 or 6.4 Kbps |
| G.726, G.727 (Adaptive Differential Pulse Code Modulation (ADPCM) | 4 kHz at 16, 24, 32, or 40 Kbps |
| G.728 (audio codec) | 3 kHz at 4 or 16 Kbps |
| G.729 (speech codec) | 3.4 kHz at 8 Kbps |

As will be appreciated, a greater the degree of compression provides generally a lower degree of voice quality.

Another QoS approach is employed by the H.323 and ReSerVation (or RSVP) Protocols. RSVP reserves network resources for a sender. Senders first specify their outgoing traffic in terms of the preferred upper and lower bounds of bandwidth, delay, and jitter. As will be appreciated, "jitter" refers to a distortion of the interpacket arrival times (the interval between packet arrivals). The network maintains this flow specification, which describes both the source's traffic stream and the application's service requirements. Although RSVP can provide acceptable QoS metrics on a successfully negotiated (reserved) path, RSVP suffers from an inability to scale over large networks. If along some network path a hop will not or does not provide the QoS requested by RSVP, the entire path is deemed inadequate. Moreover, a successfully negotiated RSVP path is problematical in that RSVP requires unshared dedicated bandwidth and imposes a substantial processing overhead on all networking elements.

Call admission or bandwidth control is another QoS solution employed to provide improved transmission characteristics end-to-end, such as available bandwidth, maximum end-to-end delay, maximum end-to-end delay variation (jitter), and maximum packet/cell loss. Call admission control, which is typically applied at a gatekeeper or gateway, regulates audio quality by limiting the number of VoIP calls that can be active on a particular link at the same time. Existing QoS measurement based call admission control mechanisms are utilization-threshold based or response-time-response probes. In utilization-threshold based call admission control, the call admission controller monitors one or more selected links and controls call placement depending on the available bandwidth on the link(s) and the required bandwidth for the call. For example, if each call requires a bandwidth of 24 kilobits/second (for a G.723 codec) and the available bandwidth for voice calls is 100 kilobits/second, call admission control will allow up to four calls to be placed and block any additional calls from being made while the bandwidth is in use. In response-time-response probe call admission control, when a call placement request is received the call admission controller determines, using measurements from various probes distributed over the network and/or network pings, the current QoS metrics in the network and, based on the metrics and the codec to be used for the call, does not permit placement of the call when desired or specified QoS metrics will not be satisfied for the call. As will be appreciated, in the absence of call admission control the placement of a call when the available bandwidth is already being used to capacity can not only provide a low audio quality for the newly placed call but also provide a lower audio quality for other calls using the congested link.

Call admission control can become problematic because the available bandwidth/allowable call quota are static variables and not dynamically optimized in response to network state. The use of static variables works very well if a link has been provisioned for VoIP and only one type of codec is used for all calls. When a combination of a high bit rate and low bit rate codecs are used, it can become difficult to exactly specify how many sessions a link can support. This can occur when the destination requests a codec different from the codec requested by the source. The use of signals from probes and pings to measure the state of the network can also be problematic. Such signals can be serviced last or completely dropped during times of congestion. This behavior can provide a false negative on network performance. This approach also may not provide detailed feedback that would indicate that the network state can descend into ill performance if more traffic is offered, thereby eliminating the possibility of pre-emptive corrective measures being undertaken. By the time that the signal measurements are processed, the VoIP QoS can already be affected. An alternative is to set the thresholds, against which the measurements are compared, very low. This approach, however, may have the adverse effect of calls being unnecessarily blocked during times of temporary congestion.

A brute force solution to the problem of insufficient bandwidth is simply to use more bandwidth. Using telephony traffic formulas, one can ascertain the maximum number of simultaneous calls during the busiest period. The bandwidth requirements for this number of calls would be calculated and then a Wide Area Network or WAN link with more available bandwidth than maximally needed obtained. This approach does solve one problem, namely that of limited bandwidth, while leading to another, namely that of undue expense. Bandwidth is expensive, especially WAN bandwidth.

SUMMARY OF THE INVENTION

These and other needs are addressed by the various embodiments and configurations of the present invention. The present invention is directed generally to dynamic bandwidth control effected by varying the codec used for live voice communications.

In a first embodiment, a method for performing call admission control is provided that includes the steps of:

(a) determining one or more of (i) a bandwidth utilization level for a first path including a first link (e.g., a communication path between two network nodes); (ii) an available bandwidth level for the first path; and (iii) one or more Quality of Service or QoS metrics for the first path;

(b) comparing the determined (i) bandwidth utilization level; (ii) available bandwidth level; and (iii) one or more Quality of Service or QoS metrics to one or more selected thresholds to determine whether a new live voice communication may be set up with a first selected codec;

(c) when a new live voice communication may not be set up with the first selected codec, performing one or more of the following steps:

(i) selecting a second different codec from among a number of possible codecs for the new live voice communication, with the second codec having a lower bit rate than the first codec;

(ii) changing an existing live voice communication from the first codec to the second codec; and (iii) redirecting the new live voice communication from the first path to a second different path.

In one configuration, each of the codecs has a corresponding bit rate and/or required bandwidth level, which is compared with the available bandwidth level and/or the bandwidth utilization level. The highest quality codec having a bit rate and/or bandwidth level permitted by the available bandwidth level and/or the bandwidth utilization level is selected.

The bandwidth can be the utilized or available bandwidth on a specific link, such as the first WAN link from an enterprise network, and/or the end-to-end bandwidth between two endpoints on an alternative link. Available end-to-end bandwidth on all possible network paths can provide a more accurate indication of voice quality for a call than the available bandwidth on the edge of only one link.

The QoS metrics can be any suitable metric and provide a measure of the state of the network. Metrics include packet delay or latency, jitter, packet loss, RSVP status and the like.

The call admission control technique of the present invention can provide a number of advantages relative to conventional systems. For example, performing call admission control by controlling bandwidth utilization through varying codecs can efficiently utilize limited bandwidth resources. It can guarantee that there is enough bandwidth available to satisfy the needs of packetized live voice applications, such as VoIP. By providing the bandwidth required by live voice applications, QoS impediments such as packet delay, jitter, and loss can be reduced substantially. This is so because networking elements are not stressed with a larger load than they can handle. Accordingly, effectively managing bandwidth utilization can provide good QoS that results in high voice quality. Blocking calls when insufficient bandwidth is available for call placement can preserve the QoS and bandwidth requirements for existing calls. Further outgoing calls will not receive less than adequate service but will be blocked and cleared or, if applicable, diverted to another route such as the PSTN or a different packet-switched link. It can also remove the possibility of networking elements being offered more traffic than they can efficiently process. Codec control offers a trade-off between voice quality and call availability. Although it can cause a slight drop in voice quality due to the use of lower bit rate codecs, it can maximize the number of voice sessions carried by any WAN link and provide substantial increases in trunking efficiency.

These and other advantages will be apparent from the disclosure of the invention(s) contained herein.

The above-described embodiments and configurations are neither complete nor exhaustive. As will be appreciated, other embodiments of the invention are possible utilizing, alone or in combination, one or more of the features set forth above or described in detail below.

DETAILED DESCRIPTION

Figure 1:
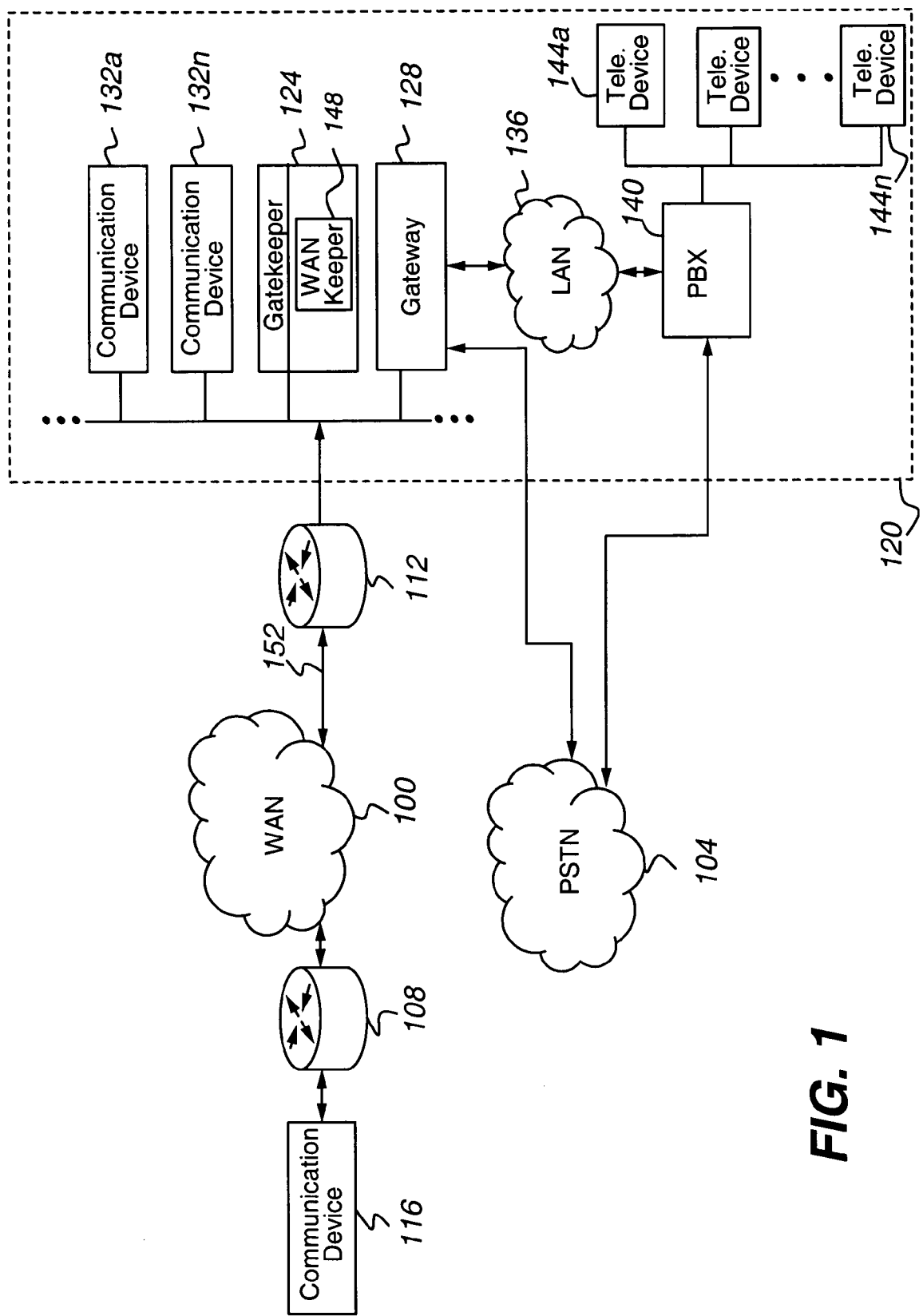
FIG. 1 is a block diagram of an illustrative hardware embodiment of the present invention.

Referring to FIG. 1, a simplified communications network is depicted. The network comprises a packet-switched Wide Area Network or WAN 100, a circuit-switched network 104, local edge routers 108 and 112, packet-switched communication device 116, and enterprise network 120. The enterprise network 120 includes a gatekeeper 124, a gateway 128, packet switched communication devices 132*a-n*, a Local Area Network or LAN 136, a Private Branch Exchange or PBX 140, and telecommunication devices 144*a-n*.

The WAN 100 can be a peer-to-peer or client/server packet-switched network applying any suitable network protocols, such as the TCP/IP suite of protocols and the AppleTalk suite of protocols. In a preferred application, the WAN 100 is the Internet.

The circuit-switched network is typically the PSTN. The PSTN trunks use the Signaling System 77 or SS7 signaling protocol.

The edge routers 108 and 112 can be any suitable router that is interoperable with the network protocol(s). The edge routers can use any suitable routing algorithm, such as the distance-vector or link-state routing algorithms. Specific examples of routing protocols applying such routing algorithms include the Routing Information Protocol or RIP, RIP version 2 or RIP-2, the Open Shortest Path First or OSPF protocol, and the Intermediate System to Intermediate System or IS-IS protocol.

The packet-switched communication devices 116 and 132*a-n* can be any packet-switched communication device for live voice communications, such as IP hardphones (such as the Avaya™ IP Hardphone), IP Softphones (such as the Avaya™ IP Softphone), Personal Digital Assistants or PDA's, 802.11 wireless phones, GSM/802.11 cellular phones, and the like.

The gatekeeper 124 provides a variety of functions, including call set-up, call control, authentication, authorization, accounting, and address mapping or lookup, translation and resolution services. The gatekeeper 124 includes a WAN keeper 148 to perform dynamic call admission control as described in detail below. A preferred gatekeeper is a modified form of the Avaya™ IP600, S8700, S8300, S8500, or S8100 media servers.

The gateway 128 is an electronic signal repeater and protocol converter allowing access into and out of circuit-switched or packet-switched networks. It can perform telephony functions such as echo cancellation, compression and decompression (or Digital Signal Processing), playing announcements and call progress tones, call signaling, and logging and recording. The gateway thus provides an interface between the packet-switched and circuit-switched networks by converting packetized communications to circuit-switched communications and vice versa. The gateway is preferably an Avaya™ G700, G650, G600 or G350 media gateway.

The PBX 140 can be any suitable telecommunications switch. Preferably, the PBX is a Definity™, MultiVantage™, Cajun™, Communication Manager switch. The PBX typically connects to the PSTN and communicates with the gatekeeper 124 and gateway 128 using ISDN PRI trunks with Q.931 signaling and the DCS or QSIG signaling protocol. As will be appreciated, though the PBX 140 and gatekeeper 124 are shown in separate boxes, the gatekeeper is typically located in the PBX 140. The gatekeeper functionality may be in the Time Division Multiplex carriers using circuit path processors. Alternatively, the gatekeeper 124 may reside in the media server.

The telecommunication devices 144a-n can be any analog or digital telephones. Preferably, the devices are one or more of the Avaya™ CallMaster™, Partner™, Meridian™, Definity™ wireless, and TransTalk™ wireless products.

The WAN keeper 148 performs dynamic call admission control by determining, based on measured QoS metrics and/or available (unused) bandwidth in the link 152 extending from the local edge router 112 to the next (nonlocal) router (not shown) in the first WAN hop and/or in the various links between the gatekeeper 124 and the destination communication device 116, and whether or not the call can be placed using any codec. If the call can be placed, the WAN keeper 148 selects the appropriate codec from among a number of possible codecs for the call. For any given call placement request, the WAN keeper 148 will seek to use the codec providing the highest voice or audio quality while using no more than the maximum available bandwidth.

The WAN keeper 148 monitors the end-to-end QoS characteristics or metrics link(s) (or network state) by any suitable technique including receiving feedback signals from one or more response-time-response probes, by polling selected network components, using ICMP ping packets, and/or SNMP/RTCP packets. The measured QoS metrics include packet delay, jitter, packet loss, the availability of Differentiated Services Code Point or DSCP or other capability to assign voice packets a priority, and RSVP status (e.g., an error message in response to a PATH and/or RESV message, and successful reservation setup. As will be appreciated, packet loss refers to packets that are not delivered to a destination.

The WAN keeper 148 can monitor the available bandwidth by a number of techniques. It can monitor the available bandwidth in the link 152 from the edge router 112 by polling the link-side interface of the edge router 112 for bandwidth utilization characteristics. It can determine the available end-to-end bandwidth using RSVP messages such as the PATH and RESV messages, Path Differentiated Services on a hop-by-hop basis, and/or Multi-Protocol Label Switching. As will be appreciated, MPLS marks and unmarks packet traffic network entry and exit points. The MPLS markings are primarily designed to determine the next router hop and can therefore be used to identify the shortest path between two end points. MPLS can include a request to the intermediate node regarding their respective available bandwidth and/or current metrics and/or query each intermediate node whether the desired call requirements can be met by that node. QoS information can also be obtained from the DS byte in an MPLS packet or by using packets having differing times to live.

Figures 3, 4:
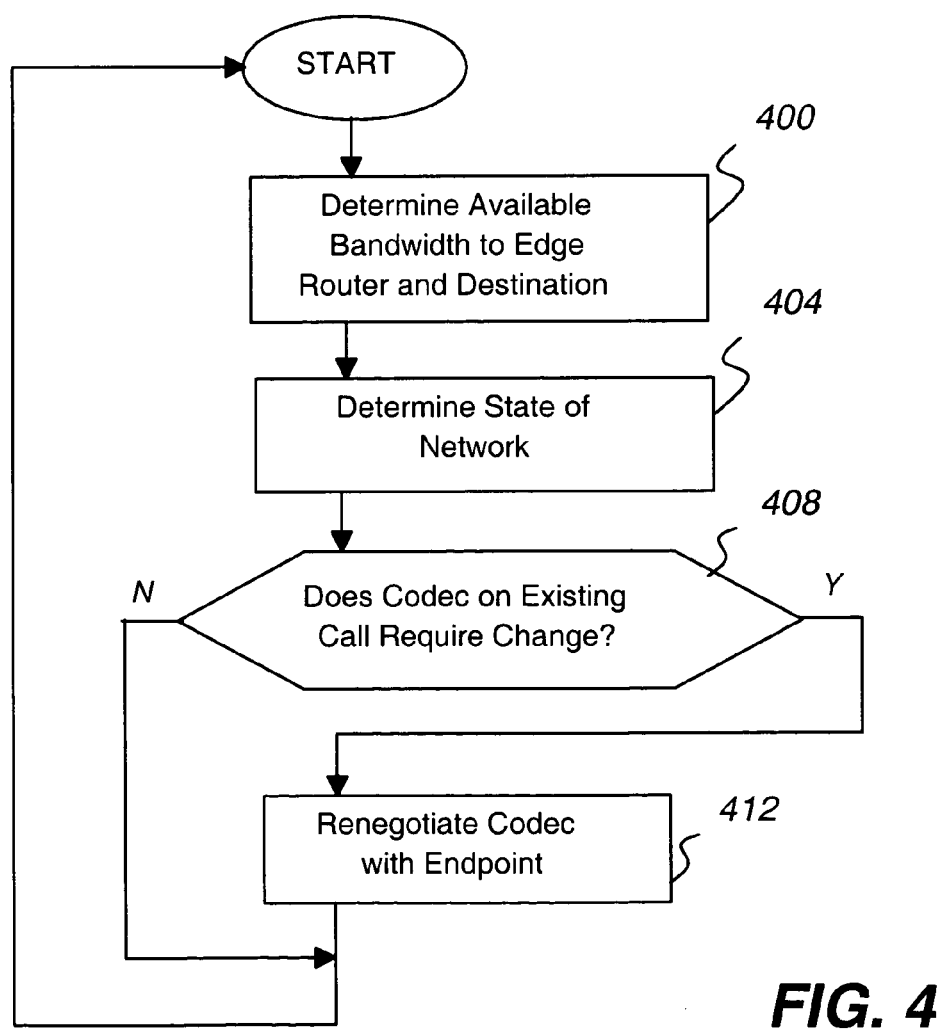
FIG. 3 is an exemplary codec usage threshold table.
FIG. 4 is a flow chart illustrating a second exemplary method of operation of the WAN keeper.

The WAN keeper 148 varies the particular codec algorithm used depending on the leftover or unused bandwidth and/or the anticipated impact on the state of the network. For example, on a 1 Mbps link that is using G.711 if 800 Kbps is already being utilized then only two more G.711 calls can be admitted; however, if the codec being used by the gatekeeper 148 is changed to G.729 then ten calls can be admitted through this link. As shown in FIG. 3, codec control normally defines a utilization threshold 300 for each codec 304. This means that if bandwidth utilization has crossed a codec's utilization threshold, the WAN keeper will take measures to ensure that future calls will use that codec. Higher quality codecs will have preference over lower quality codecs, and their utilization will correspond to low link utilization or a higher available bandwidth. Lower bit rate codecs (with lower voice quality) will have high utilization thresholds, and they will only be deployed when link utilization is high (or the available bandwidth is low).

The WAN keeper 148 will periodically monitor WAN link bandwidth utilization and end-to-end network QoS metrics. Each polling period, the WAN keeper 148 will check to see if the utilization has crossed any codec usage thresholds. It will then decide on what codec should be handed out to future outgoing VoIP calls. As noted, the decision will represent the codec with the highest utilization threshold that has been crossed. The WAN keeper 148 will instruct the media gateway 128 to change the VoIP codec being used currently.

Figure 2:
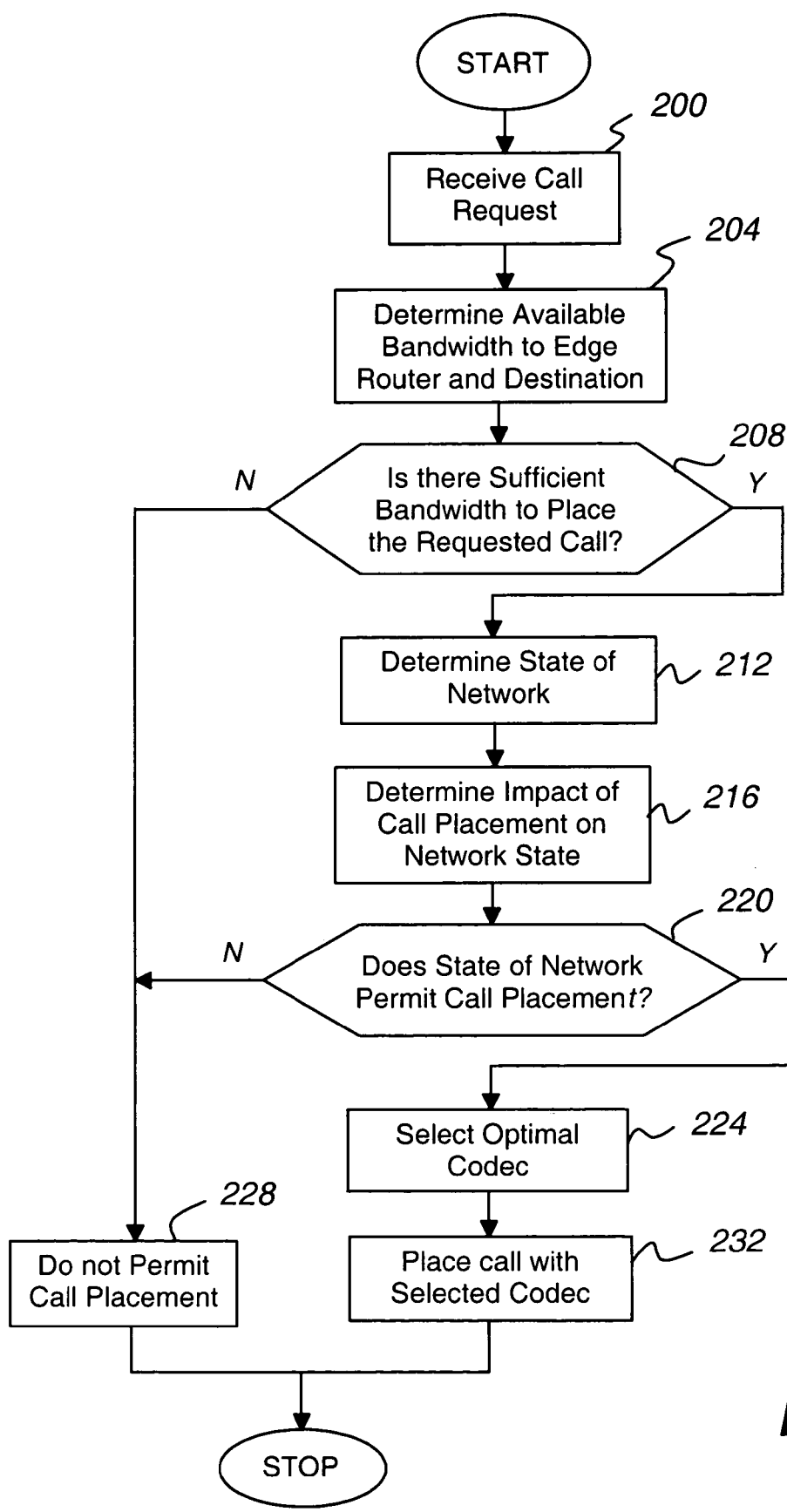
FIG. 2 is a flow chart illustrating an exemplary method of operation of the WAN keeper.

The operation of the WAN keeper 148 will now be discussed with reference to FIG. 2. Although the WAN keeper 148 is discussed with reference to the architecture of FIG. 1, it is to be understood that the WAN keeper 148 can be used with a number of other architectures.

In step 200, the gatekeeper 148 receives a call initiation request as part of the setup of a call. The call initiation request can be any signal associated with placing and/or setting up of a call, such as an off-hook signal, a dialed telephone number, an SS7 initial address message, H.323 setup message, and SIP setup message. The request identifies the communication device 116 as the destination. The request can be received from a packet-switched communication device 132a-n or from a telecommunications device 144a-n via the PBX 140.

In step 204, the WAN keeper 148 determines the available bandwidth in the WAN link 152 from the edge router 112 and between the gatekeeper 124 and the destination communication device 116. The available bandwidth determination for the link and/or path is made as follows: Available Bandwidth=Allocated Link Bandwidth−Current Bandwidth Utilization. This determination can be made when the call initiation request is received and/or at a predetermined polling interval. The polling interval is typically the largest period of time during which the probability of more than one call being initiated is very small, e.g., less than about 1%. This is so because, during this interval, only the amount of bandwidth equaling the requirements of a single VoIP call needs to be available.

In decision diamond 208, the WAN keeper 148 determines whether or not there is sufficient bandwidth to place the requested call. The bandwidth requirement of a VoIP call is deterministic and is easily calculated as follows:

Call Bandwidth=[(selected codec bit rate in bytes per second)*(audio payload in seconds)+bits required for the packet headers+the OSI Layer 2 frame header length in bits]*(packet generation rate where the packet headers include the headers for the Real-Time Transport Protocol, the User Datagram Protocol, and the Internet Protocol and the selected codec is based upon the available bandwidth and the codec control table of FIG. 3. As will be appreciated, packet generation rate is the rate at which audio packets are generated, it is the inverse of the audio payload and its unit is packets-per-second (pps), e.g., if the audio payload is 20 ms G711 packet then the packet generation rate is 50 pps. As noted, the codec selected is the codec with the highest bandwidth utilization threshold crossed or exceeded by the available bandwidth. Once the bandwidth requirement of the VoIP call is determined, it is then compared with the available bandwidth to determine whether the call can be initiated. If the selected codec cannot be accommodated, the call bandwidth can be recomputed using a different codec having a lower bandwidth utilization. This step may be repeated as necessary to find a suitable codec.

The available bandwidth is an important parameter for a bandwidth management function. For any bandwidth management function to be effective, the available bandwidth must be indicative of the available bandwidth for a reasonable length of time. It is assumed that all or a portion of the traffic through the link 152 is VoIP traffic. VoIP is relatively stable for short periods of time because endpoints use a call transmission rate sustained until ending of the call.

When there is not sufficient bandwidth for the requested call, the WAN keeper 148 proceeds to step 228 and does not permit the call to be placed. In other words, the call setup procedure is terminated.

When there is sufficient bandwidth for the requested call, the WAN keeper 148 proceeds to step 212.

In step 212, the WAN keeper 148 determines the state of the network. This is done by determining one or more selected QoS parameters other than bandwidth.

In step 216, the collected QoS parameters are adjusted by known techniques for the selected codec for the call. In other words, the likely change of the QoS parameters is determined if the call is permitted to proceed. For instance, the selected metric(s), such as packet latency, is/are adjusted for the additional network traffic resulting from placement of the call.

In decision diamond 220, the WAN keeper 148 determines if the adjusted metrics are acceptable in view of the VoIP requirements or in view of selected thresholds. The thresholds can be the same as or related to the voice communication application requirements. If not, the WAN keeper 148 selects the codec having the next lower bandwidth requirement and repeats step 216 for that codec. The process is repeated until an acceptable codec is identified. If no codec can be identified, the WAN keeper 148 proceeds to step 228. If a codec is identified, the WAN keeper proceeds to step 224 and selects that codec as the codec to be used in negotiating with the other endpoint.

In step 224, the call is permitted to proceed with the selected codec. In the event that the other endpoint is not configured to handle the selected codec, the WAN keeper selects the codec having the next lower bandwidth requirement until a codec is found that can be processed by the other endpoint. In the event that no such codec exists and a codec having a higher bandwidth requirement than the selected codec must be selected, the WAN keeper 148 can proceed to step 228 and not permit placement of the call.

A further embodiment of the present invention will be discussed with reference to FIG. 4. In this embodiment, the WAN keeper 148 periodically polls the edge router interface for bandwidth utilization statistics. When the utilization is above a maximum threshold, the WAN keeper 148 will immediately take measures to block all further outgoing calls and/or use different, lower bit rate codecs on existing calls to reduce bandwidth utilization.

Referring now to FIG. 4, the WAN keeper 148, in step 400, periodically polls the link-side interface of the edge router 112 to determine bandwidth utilization levels. The WAN keeper 148 may also determine end-to-end bandwidth utilization levels.

In optional step 404, the WAN keeper 148 can collect selected QoS metrics to determine the state of the network. The QoS metrics can include the metrics noted previously.

In decision diamond 408, the WAN keeper 148 determines whether there is sufficient bandwidth and/or whether the state of the network can support additional calls. In one configuration, this determination is made by comparing the unused or available bandwidth level(s) with a maximum threshold. The maximum threshold is provided by the following equation:

Maximum Threshold=Allocated Link VoIP Bandwidth−Bandwidth required for one VoIP call, where the allocated link VoIP bandwidth is the bandwidth dedicated to VoIP calls.

When the utilized bandwidth is above the maximum threshold or the unused bandwidth is below the maximum threshold, the WAN keeper 148 institutes one or more measures to control bandwidth utilization. In another configuration, when one or more QoS metrics exceeds selected thresholds and/or certain events are noted (e.g., the inability to make a successful reservation using the RSVP protocol), the bandwidth control measures are also implemented.

These bandwidth control measures are implemented in step 412. In one measure, the codecs used on existing VoIP calls are renegotiated to a lower bit rate codec (that will use less bandwidth). This may be effected by known techniques. In one technique, during call setup multiple possible codecs are negotiated between the endpoints, with the highest bit rate codec being used initially in the call. In the event bandwidth control measures require implementation, a lower bit rate codec (that was previously negotiated) will thereafter be used between the endpoints until bandwidth utilization level(s) and/or the QoS metric drops below selected threshold(s). When the bandwidth utilization level(s) and/or QoS metric drops below the selected threshold(s), the higher quality higher bit rate codec may be used again in the call. In another measure, future VoIP calls are blocked or redirected (to the PSTN) until bandwidth utilization level(s) and/or the QoS metric drops below selected threshold(s). In yet another measure, the WAN keeper selects a lower bit rate codec for all future VoIP calls bandwidth utilization level(s) and/or the QoS metric drops below selected threshold(s). This measure was discussed previously. Typically, the codec selected is that having the highest utilization threshold that has been crossed by the utilized bandwidth. When the bandwidth utilization level(s) and/or QoS metric drops below the selected threshold, a higher quality, higher bit rate codec may be used on future VoIP calls.

A number of variations and modifications of the invention can be used. It would be possible to provide for some features of the invention without providing others.

For example in one alternative embodiment, the WAN keeper is located in a media server, a telecommunications switch, such as a PBX, the gateway, a communication or telecommunication device and/or the edge router.

In another alternative embodiment, the available bandwidth is decreased by a safety factor to account for unforeseen or unknown network conditions.

In yet another alternative embodiment, the WAN keeper can also perform traffic control. Traffic control describes intelligently managing VoIP traffic over more than one WAN link. If an enterprise network includes two WAN links, it will be optimal to fail over from a first WAN link to a lightly used second WAN link when the first WAN link is at bandwidth capacity. The situation may also be such that one of the first and second WAN links is more expensive than the other in that the cost per MB transmitted is higher. In that situation, the VoIP calls would be sent out on the less expensive WAN link first and when that link is at capacity fail over to the more expensive WAN link.

The WAN keeper monitors the default (cheaper) link for bandwidth utilization. Upon utilization being more than its threshold limit (the maximum threshold), the WAN keeper will take measures so that future outgoing voice calls will be directed to the expensive link. WAN keeper will periodically check back on the cheaper or default link to determine if the traffic has fallen below the threshold. If so, it will take measures to direct VoIP calls back to the default link.

For traffic control, the WAN keeper will exploit UDP port-based IP packet classification. The local edge router will be configured such that packets with destination ports within a defined range are routed to a first (cheaper) link and packets with ports in a second different range are routed to a second (more expensive) link. When the WAN keeper is to perform traffic control and direct voice calls to the appropriate link, it will provide direct feedback to the PBX or gatekeeper to change the port range it provides as part of its VoIP call setup signaling. Traffic control focuses on maintaining existing calls to use the near exhausted first link but future calls will be routed to use the available second link.

Traffic control is a friendlier bandwidth management method than call admission control as traffic control will try to find an available link before call admission control is activated. In call admission control, calls are immediately cut off as soon as the threshold is crossed.

In yet another embodiment, the WAN keeper can use one or more of the utilized bandwidth on the local WAN link, the utilized end-to-end bandwidth, and selected QoS metrics in effecting call admission control.

In yet another embodiment, the WAN keeper logic may be implemented in more than one computational components.

In yet another embodiment, calls are blocked by a media server. The media server periodically sends out ping test packets, such as ICMP packets, to obtain feedback on the network state. The WAN keeper independently monitors bandwidth utilization and QoS metrics and, when the WAN keeper concludes that no further VoIP calls can be placed, instructs the local edge router to drop all ping test packets. The dropping of the ping test packets will cause the media server to conclude that the network state is unable to support further VoIP calls, and the media server will thereafter block such calls. The ping test thresholds used by the media server in determining when VoIP calls are to be blocked can be set high to prevent the media server from accidentally/independently blocking outgoing calls due to temporary periods of high network congestion.

In yet another embodiment, the WAN keeper is implemented as software, a logic circuit such as an ASIC, or combinations thereof.

In yet another embodiment, the WAN keeper is used to perform call admission control on a circuit-switched network.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover though the description of the invention has included description of one or more embodiments and certain variations and modifications, other variations and modifications are within the scope of the invention, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for performing call admission control, comprising:
(a) determining at least one of (i) a bandwidth utilization level for a first Wide Area Network (WAN) path including a first WAN link, and (ii) an available bandwidth level for the first WAN path and one or more Quality of Service or QoS metrics for the first WAN path;
(b) comparing the determined at least one bandwidth level and the one or more QoS metrics to one or more selected thresholds to determine whether a new live voice communication may be set up with a first selected codec, wherein the comparing step (b) comprises:
(b1) adjusting the one or more QoS metrics to reflect placing the new live voice communication with the first selected codec;

(b2) determining whether the adjusted one or more QoS metrics are acceptable in view of selected thresholds; and (b3) applying the following rules:

(b3i) when the adjusted QoS metrics are acceptable, setting up the new live voice communication with the first selected codec; and (b3ii) when the adjusted QoS metrics are not acceptable, performing step (c); and (c) determining that the new live voice communication may not be set up with the first selected codec and in response to determining that the new live voice communication may not be set up with the first selected codec performing at least one of the following steps:

(i) selecting a second different codec from among a plurality of possible codecs for the new live voice communication, wherein the second codec has a lower bit rate than the first codec;

(ii) changing an existing live voice communication on the first WAN path from the first codec to the second codec; and (iii) redirecting the new live voice communication from the first WAN path to a second different WAN path, wherein the second WAN path does not include the first WAN.

2. The method of claim 1, wherein, when there is no codec from among the plurality of codecs that satisfies the one or more thresholds, performing one or more of blocking the new live voice communication and redirecting the new live voice communication from a packet-switched network to a circuit-switched network.

3. A method for performing call admission control, comprising:

(a) determining at least one of (i) a bandwidth utilization level for a first Wide Area Network (WAN) path including a first WAN link, and (ii) an available bandwidth level for the first WAN path and one or more Quality of Service or QoS metrics for the first WAN path;

(b) comparing the determined at least one bandwidth level and the one or more QoS metrics to one or more selected thresholds to determine whether a new live voice communication may be set up with a first selected codec; and (c) determining that the new live voice communication may not be set up with the first selected codec and in response to determining that the new live voice communication may not be set up with the first selected codec performing at least one of the following steps:

(i) selecting a second different codec from among a plurality of possible codecs for the new live voice communication, wherein the second codec has a lower bit rate than the first codec;

(ii) changing an existing live voice communication on the first WAN path from the first codec to the second codec; and (iii) redirecting the new live voice communication from the first WAN path to a second different WAN path, wherein the second WAN path does not include the first WAN, wherein in the determining step (c) the available bandwidth level is determined and compared with a maximum threshold provided by the equation: Maximum Threshold=Allocated Link VoIP Bandwidth−Bandwidth required for one VoIP call, where the allocated VoIP bandwidth is the bandwidth dedicated to VoIP calls and wherein, when the available bandwidth is below the maximum threshold, one or more of (i), (ii), and (iii) is performed.

4. The method of claim 3, wherein substep (c)(i) is performed and further comprising:

receiving a request to place the new live voice communication; and setting up the new live voice communication with the second codec.

5. The method of claim 4, wherein each of a plurality of codecs has a corresponding bit rate and/or required utilization threshold and the selecting step comprises:

comparing at least one of the available bandwidth level and the bandwidth utilization level with the plurality of bit rates and/or utilization thresholds; and selecting the highest quality codec having a corresponding bit rate and/or utilization level permitted by the at least one of the available bandwidth level and the bandwidth utilization level.

6. The method of claim 4, wherein the comparing comprises:

comparing at least one of (i) a bandwidth utilization level and (ii) an available bandwidth level with one or more selected thresholds; and comparing one or more Quality of Service or QoS metrics with one or more selected thresholds, wherein the second codec has a bandwidth usage characteristic sufficient to satisfy the comparing steps.

7. The method of claim 3, wherein substep (c)(ii) is performed.

8. The method of claim 7, wherein, when the existing live voice communication was set up, the first and second codecs were identified as being acceptable to both endpoints.

9. The method of claim 7, wherein substep (c)(ii) comprises:

renegotiating with the destination the codec to be used in the live voice communication.

10. The method of claim 3, wherein substep (c)(iii) is performed.

11. The method of claim 10, wherein the first WAN link corresponds to a first set of port numbers and the second WAN link to a second set of port numbers, wherein the first and second sets of port numbers are non-overlapping, wherein packets addressed to one of the first set of port numbers are directed along the first WAN link and packets addressed to one of the second set of port numbers are directed along the second WAN link and wherein the redirecting step comprises:

selecting for the packetized live voice communication a port address from the first set of port numbers when a new live voice communication can be set up with the first selected codec and selecting for the packetized live voice communication a port address from the second set of port numbers when a new live voice communication cannot be set up with the first selected codec.

12. The method of claim 3, wherein in the determining step the bandwidth utilization level is determined.

13. The method of claim 12, wherein the bandwidth utilization level is determined by polling a local edge router and wherein the first WAN link comprises a WAN link between the local edge router and the WAN.

14. The method of claim 12, wherein the bandwidth utilization level is the end-to-end bandwidth determined using at least one of Reservation Protocol messages, Path Differentiated Services, and Multi-Protocol Label Switching.

15. The method of claim 3, wherein the available bandwidth level is determined by polling a local edge router.

16. The method of claim 3, wherein the available bandwidth level is the end-to-end bandwidth determined using at least one of Reservation Protocol messages, Path Differentiated Services, and Multi-Protocol Label Switching.

17. The method of claim 3, wherein one or more QoS metrics is determined for the first path.

18. The method of claim 17, wherein the one or more QoS metrics is at least one of packet delay, jitter, packet loss, the availability of Differential Services Code Point, and RSVP status.

19. The method of claim 3, wherein the available bandwidth level is the bandwidth allocated to live voice communications less the bandwidth utilization level.

20. A computer readable medium having processor executable instructions stored thereon that, when executed, perform the steps of claim 3.

21. A call admission controller, comprising:
a processor operable to:
(a) determine at least one of (i) a bandwidth utilization level for a first WAN path including a first WAN ink, and (ii) an available bandwidth level for the first WAN path, and one or more Quality of Service or QoS metrics for the first WAN path;
(b) compare the determined at least one bandwidth level and the one or more QoS metrics to one or more selected thresholds to determine whether a new live voice communication may be set up with a first selected codec, wherein the comparing operation comprises:
(b1) adjusting the one or more QoS metrics to reflect placing the new live voice communication with the first selected codec;
(b2) determining whether the adjusted one or more QoS metrics are acceptable in view of selected thresholds; and
(b3) applying the following rules:
(b3i) when the adjusted QoS metrics are acceptable, setting up the new live voice communication with the first selected codec; and
(b3ii) when the adjusted QoS metrics are not acceptable, performing the comparing operation; and
(c) determining that the new live voice communication may not be set up with the first selected codec and in response to determining that the new live voice communication may not be set up with the first selected codec performing at least one of the following operations:
(i) select a second different codec from among a plurality of possible codecs for the new live voice communication, wherein the second codec has a lower bit rate than the first codec;
(ii) change an existing live voice communication on the first WAN path from the first codec to the second codec; and
(iii) redirect the new live voice communication from the first WAN path to a second different WAN path, wherein the second WAN path does not include the first WAN link.

22. The controller of claim 21, wherein, when there is no codec from among the plurality of codecs that satisfies the one or more thresholds, the processor one or more of blocks the new live voice communication and redirects the new live voice communication from a packet-switched network to a circuit-switched network.

23. A call admission controller, comprising:
a processor operable to:
(a) determine at least one of (i) a bandwidth utilization level for a first WAN path including a first WAN ink, and (ii) an available bandwidth level for the first WAN path, and one or more Quality of Service or QoS metrics for the first WAN path;
(b) compare the determined at least one bandwidth level and the one or more QoS metrics to one or more selected thresholds to determine whether a new live voice communication may be set up with a first selected codec; and
(c) determining that the new live voice communication may not be set up with the first selected codec and in response to determining that the new live voice communication may not be set up with the first selected codec performing at least one of the following operations:
(i) select a second different codec from among a plurality of possible codecs for the new live voice communication, wherein the second codec has a lower bit rate than the first codec;
(ii) change an existing live voice communication on the first WAN path from the first codec to the second codec; and
(iii) redirect the new live voice communication from the first WAN path to a second different WAN path, wherein the second WAN path does not include the first WAN link, wherein in the determining operation (c) the available bandwidth level is determined and compared with a maximum threshold provided by the equation: Maximum Threshold=Allocated Link VoIP Bandwidth−Bandwidth required for one VoIP call, where the allocated VoIP bandwidth is the bandwidth dedicated to VoIP calls and wherein, when the available bandwidth is below the maximum threshold, one or more of (i), (ii), and (iii) is performed.

24. The controller of claim 23, wherein operation (c)(i) is performed and further comprising the operations of:
receiving a request to place the new live voice communication; and
setting up the new live voice communication with the second codec.

25. The controller of claim 24, wherein each of a plurality of codecs has a corresponding bit rate and/or required utilization threshold and the selecting operation comprises:
comparing at least one of the available bandwidth level and the bandwidth utilization level with the plurality of bit rates and/or utilization thresholds; and
selecting the highest quality codec having a corresponding bit rate and/or utilization threshold permitted by the at least one of the available bandwidth level and the bandwidth utilization level.

26. The controller of claim 24, wherein the comparing operation comprises:
comparing at least one of (i) a bandwidth utilization level and (ii) an available bandwidth level with one or more selected thresholds; and
comparing one or more Quality of Service or QoS metrics with one or more selected thresholds, wherein the second codec has a bandwidth usage characteristic sufficient to satisfy the comparing steps.

27. The controller of claim 23, wherein operation (c)(ii) is performed.

28. The controller of claim 27, wherein, when the existing live voice communication was set up, the first and second codecs were identified as being acceptable to both endpoints.

29. The controller of claim 27, wherein operation (c)(ii) comprises:
   renegotiating with the destination the codec to be used in the live voice communication.

30. The controller of claim 23, wherein operation (c)(iii) is performed.

31. The controller of claim 30, wherein the first WAN link corresponds to a first set of port numbers and the second WAN link to a second set of port numbers, wherein the first and second sets of port numbers are non-overlapping, wherein packets addressed to one of the first set of port numbers are directed along the first WAN link and packets addressed to one of the second set of port numbers are directed along the second WAN link and wherein the redirecting operation comprises:
   selecting for the packetized live voice communication a port address from the first set of port numbers when a new live voice communication can be set up with the first selected codec and
   selecting for the packetized live voice communication a port address from the second set of port numbers when a new live voice communication cannot be set up with the first selected codec.

32. The controller of claim 23, wherein in the determining operation the bandwidth utilization level is determined.

33. The controller of claim 32, wherein the bandwidth utilization level is determined by polling a local edge router and wherein the first WAN link comprises a WAN link between the local edge router and the WAN.

34. The controller of claim 32, wherein the bandwidth utilization level is the end-to-end bandwidth determined using at least one of Reservation Protocol messages, Path Differentiated Services, and Multi-Protocol Label Switching.

35. The controller of claim 23, wherein the available bandwidth level is determined by polling a local edge router.

36. The controller of claim 23, wherein the available bandwidth level is the end-to-end bandwidth determined using at least one of Reservation Protocol messages, Path Differentiated Services, and Multi-Protocol Label Switching.

37. The controller of claim 23, wherein one or more QoS metrics is determined for the first path.

38. The controller of claim 37, wherein the one or more QoS metrics is at least one of packet delay, jitter, packet loss, the availability of Differential Services Code Point, and RSVP status.

39. The controller of claim 23, wherein the available bandwidth level is the bandwidth allocated to live voice communications less the bandwidth utilization level.

* * * * *

UNITED STATES PATENT AND TRADEMARK OFFICE
CERTIFICATE OF CORRECTION

PATENT NO.       : 7,643,414 B1                                    Page 1 of 1
APPLICATION NO.  : 10/776894
DATED            : January 5, 2010
INVENTOR(S)      : Muneyb Minhazuddin It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1264 days.

Signed and Sealed this

Sixteenth Day of November, 2010

David J. Kappos
*Director of the United States Patent and Trademark Office*

UNITED STATES PATENT AND TRADEMARK OFFICE
CERTIFICATE OF CORRECTION

PATENT NO.        : 7,643,414 B1                                    Page 1 of 2
APPLICATION NO.   : 10/776894
DATED             : January 5, 2010
INVENTOR(S)       : Muneyb Minhazuddin It is certified that error appears in the above-identified patent and that said Letters Patent is hereby corrected as shown below:

Title page item [57] Abstract, "and (iii) when" should be changed to --and (c) when--.

Claim 1, Column 10, line 59, after "one" insert --of (i)--.
Claim 1, Column 10, line 59, after "bandwidth" insert --utilization--.
Claim 1, Column 10, line 60, after "and" insert --(ii) available bandwidth level and--.

Claim 3, Column 11, line 39, after "one" insert --of (i)--.
Claim 3, Column 11, line 39, after "bandwidth" insert --utilization--.
Claim 3, Column 11, line 40, after "and" insert --(ii) available bandwidth level and--.
Claim 3, Column 11, line 65, after "bandwidth" insert --level--.

Claim 5, Column 12, line 10, after "comparing" insert --the--.
Claim 5, Column 12, line 10, "the available bandwidth level and the bandwidth utilization level" should be changed to --(i) the bandwidth utilization level and (ii) the available bandwidth level--.
Claim 5, Column 12, line 15, "the available bandwidth level and the bandwidth utilization level." should be changed to --(i) the bandwidth utilization level and (ii) the available bandwidth level.--.

Claim 6, Column 12, line 19, after "comparing" insert --the--.
Claim 6, Column 12, line 19, after "(i)" delete "a".
Claim 6, Column 12, line 20, after "(ii)" delete "an".

Claim 17, Column 13, line 4, after "first" insert --WAN--.

Claim 21, Column 13, line 18, "WAN" should be changed to --Wide Area Network (WAN)--.
Claim 21, Column 13, line 18, "ink" should be changed to --link--.
Claim 21, Column 13, line 22, after "one" insert --of (i)--.
Claim 21, Column 13, line 22, after "bandwidth" insert --utilization--.
Claim 21, Column 13, line 23, after "and" insert --(ii) available bandwidth level and--.

Signed and Sealed this
Fifth Day of June, 2012

David J. Kappos
*Director of the United States Patent and Trademark Office*

Claim 22, Column 13, line 60, after "more" insert --selected--.

Claim 23, Column 13, line 67, "WAN" should be changed to --Wide Area Network (WAN)--.
Claim 23, Column 13, line 67, "ink" should be changed to --link--.
Claim 23, Column 14, line 4, after "one" insert --of (i)--.
Claim 23, Column 14, line 4, after "bandwidth" insert --utilization--.
Claim 23, Column 14, line 5, after "and" insert --(ii) available bandwidth level and--.
Claim 23, Column 14, line 10, after "and" insert --,--.
Claim 23, Column 14, line 13, after "codec" insert --,--.
Claim 23, Column 14, line 25, after "wherein" insert --,--.
Claim 23, Column 14, line 26, after "(c)" insert --,--.

Claim 25, Column 14, line 44, after "comparing" insert --the--.
Claim 25, Column 14, line 44, "the available bandwidth level and the bandwidth utilization level" should be changed to --(i) the bandwidth utilization level and (ii) the available bandwidth level--.
Claim 25, Column 14, line 49, after "the available bandwidth level and the bandwidth utilization level." should be changed to --(i) the bandwidth utilization level and (ii) the available bandwidth level--.

Claim 26, Column 14, line 53, after "comparing" insert --the--.
Claim 26, Column 14, line 53, after "(i)" delete "a".
Claim 26, Column 14, line 54, after "(ii)" delete "an".

Claim 32, Column 15, line 24, after "wherein" insert --,--.
Claim 32, Column 15, line 25, after "operation" insert --,--.

Claim 37, Column 16, line 16, after "first" insert --WAN--.